Patented Mar. 17, 1936

2,034,165

UNITED STATES PATENT OFFICE 2,034,165

PIPE JOINT

Samuel T. Wentz, Matthews, N. C., assignor to Charlotte Pipe and Foundry Company, Inc., Charlotte, N. C., a corporation of North Carolina Application November 19, 1934, Serial No. 753,705

1 Claim. (Cl. 285—115)

This invention relates to a pipe joint and more especially to a pipe joint for soil pipes, cast iron pipes and the like.

It is an object of this invention to provide a soil pipe joint having an enlarged cavity in the female portion of the pipe which is adapted to receive a packing such as oakum after the male pipe has been inserted therein.

Heretofore, great difficulty has been experienced in pipes of this nature, breaking at the point where the enlargement of the female portion adjoins the body portion of the pipe and also breakage has occurred around the extreme end of the female portion, and it is an object of this invention to provide a pipe in which the female end portion is reinforced, both at the junction of the enlarged portion with the body portion of the pipe and also at the extreme end of the pipe.

It is a further object of this invention to provide in a joint for a soil pipe and the like, a female portion having an enlarged recess on the interior thereof which is of greater cross-sectional area than the extreme end of the female joint portion and to provide a male end insertable into the female portion, said male end having an enlarged end portion with a sloping shoulder located between the enlarged end portion and the body portion of the pipe so as to exert a wedging action on the packing when longitudinal strain is applied to the two sections of pipes.

Some of the objects of the invention having been stated, other objects will appear as the description proceeds when taken in connection with the accompanying drawing, in which:—

Figure 1:
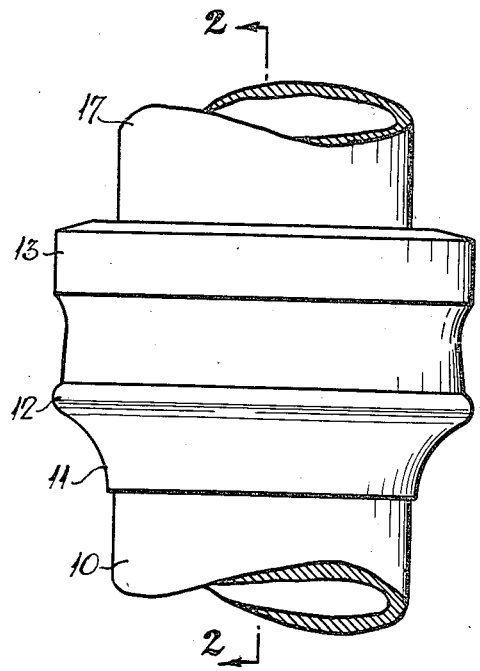
Figure 1 is an elevation of my improved pipe joint.

Referring more specifically to the drawing, the numeral 10 indicates a pipe having an enlarged reinforced flared portion 11, said portion being of substantially greater thickness than has heretofore been employed and terminating in a beaded flange 12 and also having a flange 13 at the upper end thereof of substantial thickness and of very much greater width than has heretofore been employed to provide additional strength to the extreme female end of the pipe. The female portion has an opening 14 which is according to specification and disposed immediately inside the opening is a groove 15. Instead of the interior of the female portion of the pipe being substantially of the same cross-sectional area all the way, it flares outwardly and therefore has the enlarged portion 16. The male end 17 of the pipe has a thickened portion 18 at its tip and has a sloping exterior portion 19 adjoining the thickened portion 18 and the conventional portion 10 of the pipe 17.

Figure 2:
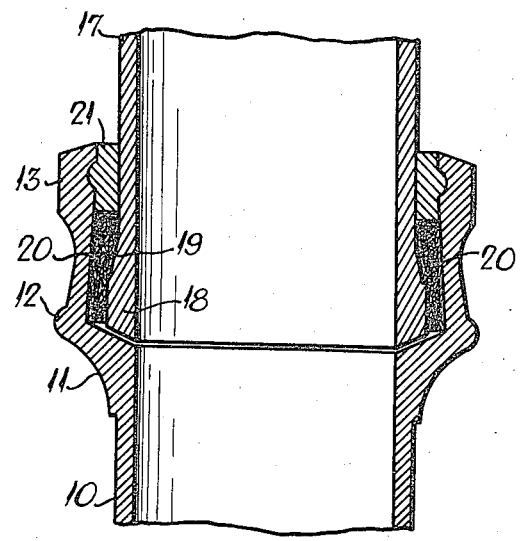
Figure 2 is a vertical sectional view taken along line 2—2 in Figure 1.
Figure 3:
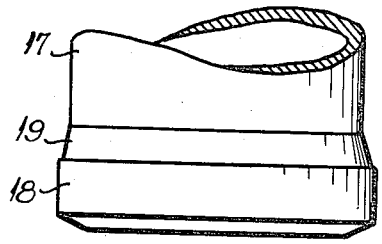
Figure 3 is an elevation of the male portion of the joint.
Figure 4:
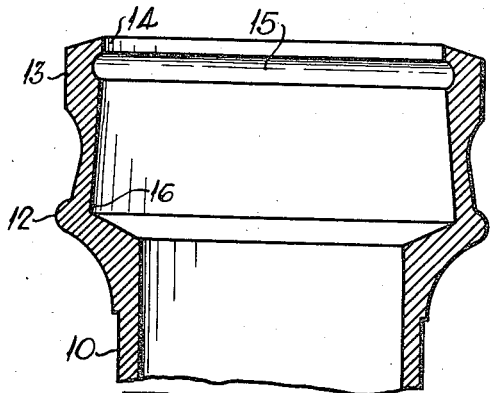
Figure 4 is a vertical sectional view similar to Figure 2 but omitting the male portion, the packing and the metallic seal.

With the parts in the position as shown in Figure 2, oakum 20 or other suitable packing, is placed in position in a conventional manner and molten metal, usually lead 21, is poured in position, the lead also filling the conventional groove 15.

On account of the female end of the pipe having the thickened portion 11, greater strength is imparted to this point of the pipe and frequent breakage, which has heretofore occurred, is eliminated. By making the thickened portion 13 very much broader than has heretofore been the practice, greater strength is imparted to the extreme tip of the female portion of the pipe and lateral strains as well as longitudinal strains are withstood without breakage.

By providing the sloping portion 19 a distinct advantage is obtained in that any longitudinal pull on the pipes 17 and 10, in opposed directions causes the sloping surface 19 to exert a wedging action on the packing 20. Also by having the internal diameter at 16 substantially greater than the internal diameter at 14, a greater cavity is provided for the reception of the packing and the wedging action between the two ends of the pipes is greatly increased.

In the drawing and specification there has been set forth a preferred embodiment of the invention, and although specific terms are employed, they are used in a generic and descriptive sense only, and not for purposes of limitation, the scope of the invention being set forth in the appended claim.

I claim:

A soil pipe joint comprising a female portion and a male portion, the female portion at its junction with the main body of the pipe being substantially thickened to reinforce the same and the extreme tip of the male portion being substantially reinforced, the interior of the female portion progressively increasing in diameter from its tip portion to the base of the female portion, a male portion having an enlargement on its extreme end whose outer surface is parallel to the axis of the male portion and a sloping portion adjoining the enlarged portion and the main body of the male portion of the pipe so as to present a wedging action between the female and male portions of the pipes when they are in an assembled position and packing is inserted and sealed between the female and male portions of the pipe.

his
   SAMUEL × T. WENTZ.
       mark

Witnesses as to applicant's mark:
 W. C. THOMPSON,
 ROBERT BROWN, Jr.